United States Patent
Sallas et al.

(10) Patent No.: US 10,448,307 B2
(45) Date of Patent: Oct. 15, 2019

(54) SYSTEMS AND METHODS FOR MANAGING NETWORK DEVICES

(71) Applicant: COMCAST CABLE COMMUNICATIONS, LLC, Philadelphia, PA (US)

(72) Inventors: Michael Sallas, Radnor, PA (US); Ross Gilson, Philadelphia, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 14/331,988

(22) Filed: Jul. 15, 2014

(65) Prior Publication Data
US 2016/0021485 A1    Jan. 21, 2016

(51) Int. Cl.
*H04W 40/02*  (2009.01)
*H04W 48/14*  (2009.01)
*H04W 8/00*   (2009.01)
*H04W 4/80*   (2018.01)

(52) U.S. Cl.
CPC ............ *H04W 40/02* (2013.01); *H04W 4/80* (2018.02); *H04W 8/005* (2013.01); *H04W 48/14* (2013.01)

(58) Field of Classification Search
CPC .................. H04W 12/08; H04W 36/14; H04L 2012/5607
See application file for complete search history.

(56) References Cited

U.S. PATENT DOCUMENTS

| | | | | |
|---|---|---|---|---|
| 6,523,696 B1* | 2/2003 | Saito | .................. | H04N 21/2381 375/E7.019 |
| 9,210,357 B1* | 12/2015 | Dong | ................... | H04N 5/4403 |
| 9,294,460 B1* | 3/2016 | Thomas | .............. | H04L 63/0807 |
| 2002/0085540 A1* | 7/2002 | Hyvarinen | ............ | H04W 48/18 370/352 |
| 2003/0066080 A1* | 4/2003 | Kamieniecki | ...... | H04N 5/44513 725/80 |
| 2006/0172700 A1* | 8/2006 | Wu | ......................... | G06F 21/35 455/41.2 |
| 2008/0004904 A1* | 1/2008 | Tran | ..................... | A61B 5/0006 705/2 |
| 2009/0254666 A1* | 10/2009 | Agulnik | .............. | H04L 12/5692 709/228 |
| 2010/0015919 A1* | 1/2010 | Tian | ..................... | H04W 12/06 455/41.2 |
| 2011/0014868 A1* | 1/2011 | Yun | ..................... | H04M 1/7253 455/41.2 |
| 2011/0047465 A1* | 2/2011 | Thiyagarajan | ........ | G06F 3/0485 715/734 |

(Continued)

*Primary Examiner* — Wen W Huang
(74) *Attorney, Agent, or Firm* — Ballard Spahr LLP

(57) ABSTRACT

Methods and systems for pairing two or more devices, such as a remote control and a display device, are described. The controlling and managing can occur utilizing one or more network connections or communication paths. An example method can comprise a second device receiving a device identifier of a first device via a first network, receiving the device identifier of the first device via a second network, matching the device identifier received via the first network and via the second network, and establishing an association between the first device and the second device over the first network and the second network.

20 Claims, 9 Drawing Sheets

(56) References Cited

U.S. PATENT DOCUMENTS

| | | | | |
|---|---|---|---|---|
| 2011/0159871 A1* | 6/2011 | Choo | ................. | H04W 8/26 |
| | | | | 455/426.1 |
| 2011/0163939 A1* | 7/2011 | Tam | ................. | G06F 3/1454 |
| | | | | 345/2.3 |
| 2011/0210848 A1* | 9/2011 | Howard | ............ | G08B 21/0247 |
| | | | | 340/539.32 |
| 2012/0242455 A1* | 9/2012 | Hale | ................. | G08C 17/02 |
| | | | | 340/10.1 |
| 2014/0273844 A1* | 9/2014 | Castillo | ............... | H04B 7/2612 |
| | | | | 455/41.2 |
| 2014/0278475 A1* | 9/2014 | Tran | ................ | G06F 19/3418 |
| | | | | 705/2 |
| 2014/0280983 A1* | 9/2014 | Paluch | ................ | H04L 67/14 |
| | | | | 709/227 |
| 2014/0287684 A1* | 9/2014 | Van Den Bosch | ... | H04W 8/005 |
| | | | | 455/41.2 |
| 2015/0089222 A1* | 3/2015 | White | ............... | H04L 63/0428 |
| | | | | 713/168 |

\* cited by examiner

SYSTEMS AND METHODS FOR MANAGING NETWORK DEVICES

BACKGROUND

It has become commonplace for a network device to access more than one type of network connection. For example, a first device can communicate with a second device via a first network and a second network. An effective network device management mechanism is needed to associate and manage communications between the first device and the second device via the first network and the second network.

SUMMARY

It is to be understood that both the following general description and the following detailed description are exemplary and explanatory only and are not restrictive, as claimed. Provided are methods and systems for managing network devices. In an aspect, an example system can comprise a first device, a second device, a third device, and an optional fourth device. In an aspect, the first device, the second device, the third device, and the fourth device can be configured to communicate via a first network. In another aspect, the first device and the second device can be configured to communicate via a second network. As such, the first device can be associated with a plurality of device identifiers, for example, a first network first device identifier (e.g., a device identifier of the first device in the first network) and a second network first device identifier (e.g., a device identifier of the first device in the second network). Similarly, the second device can be associated with a plurality of device identifiers, for example, a first network second device identifier (e.g., a device identifier of the second device in the first network) and a second network second device identifier (e.g., a device identifier of the second device in the second network).

In an aspect, the first device can be a control device (e.g., a user device) and second device can be a target device that receives one or more commands from the first device via the first network and via the second network. The third device can comprise computing devices that facilitate communication between the first device and the second device. As an example, the first device can comprise a remote control, a computer, a smart phone, a tablet, a laptop, a PDA, and the like. As another example, the second device can comprise a display device, television set-top box, an alarm system, a lighting system, a heating system, a ventilation system, a cooling system, and the like. The third device can comprise one or more of servers, routers, gateway systems, computers, network nodes, peer devices, and the like. By way of example, the fourth device can be an electronic device, such as a computer, a smart phone, a tablet, a laptop, a PDA, and the like. In an aspect, the first network can comprise an internet protocol (IP) network. The second network can comprise one or more of a radio frequency for consumer electronics (RF4CE) network, Bluetooth network, ZigBee network, radio frequency (REF) network, Wi-Fi network, internet protocol (IP) network, and/or the like.

In an aspect, an example method can comprise the second device receiving a first network first device identifier from the first device via the first network (e.g., an IP network), and receiving the first network first device identifier from the first device via the second network (e.g., a RF4CE network). The second device can match the first network first device identifier received via the first network and via the second network, and establish an association between the first device and the second device over the first network and the second network.

In an aspect, an example method can comprise the second device receiving a first network first device identifier from the first device via the first communication path (e.g., an IP communicationpath), and receiving the first network first device identifier from the first device via the second communication path (e.g., a radio frequency communication path). The second device can match the first network first device identifier received via the first communication path and via the second communication path, and establish an association between the first device and the second device over the first communication path and the second communication path.

In an aspect, an example method can comprise the second device receiving a second network first device identifier from the first device via the first network (e.g., an IP network), and receiving the second network first device identifier from the first device via the second network (e.g., a RF4CE network). The second device can match the second network first device identifier received via the first network and via the second network, and establish an association between the first device and the second device over the first network and the second network.

In another aspect, an example method can comprise the first device sending a discovery request, and receiving ranking information of a plurality of second devices. In an aspect, the first device can retrieve a device identifier (e.g., a first network second device identifier, a second network device second device identifier) of the highest ranking second device from a third device. Alternatively, the first device can transmit its device identifier (e.g., a first network first device identifier, a second network first device identifier) to the highest ranking second device. If the device identifier of the highest ranking second device matches the device identifier of the first device, the first device can be paired with the highest ranking second device. In an aspect, a user of the first device can validate the highest ranking second device in the pairing. In an aspect, if the pairing is not successful, a next highest ranking second device can be used for pairing.

In an aspect, the third device can authenticate the first device before facilitating communication between the first device and the second device. In an aspect, the first device can provide user information (e.g., a user identifier, password, key, login credential) to the third device for authentication. Alternatively, the optional fourth device can be used to facilitate authentication of the first device. For example, the fourth device can identify the first device via a discovery service. In an aspect, the fourth device can provide user information to the first device, and in turn, the first device can provide the user information to the third device for authentication. In another aspect, the fourth device can provide the user information to the third device on behalf of the first device. For example, the fourth device can be used as an input device for a user to provide user information (e.g., a user identifier, password, key, login credential). The user information can be transmitted from the fourth device to the third device and/or the first device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
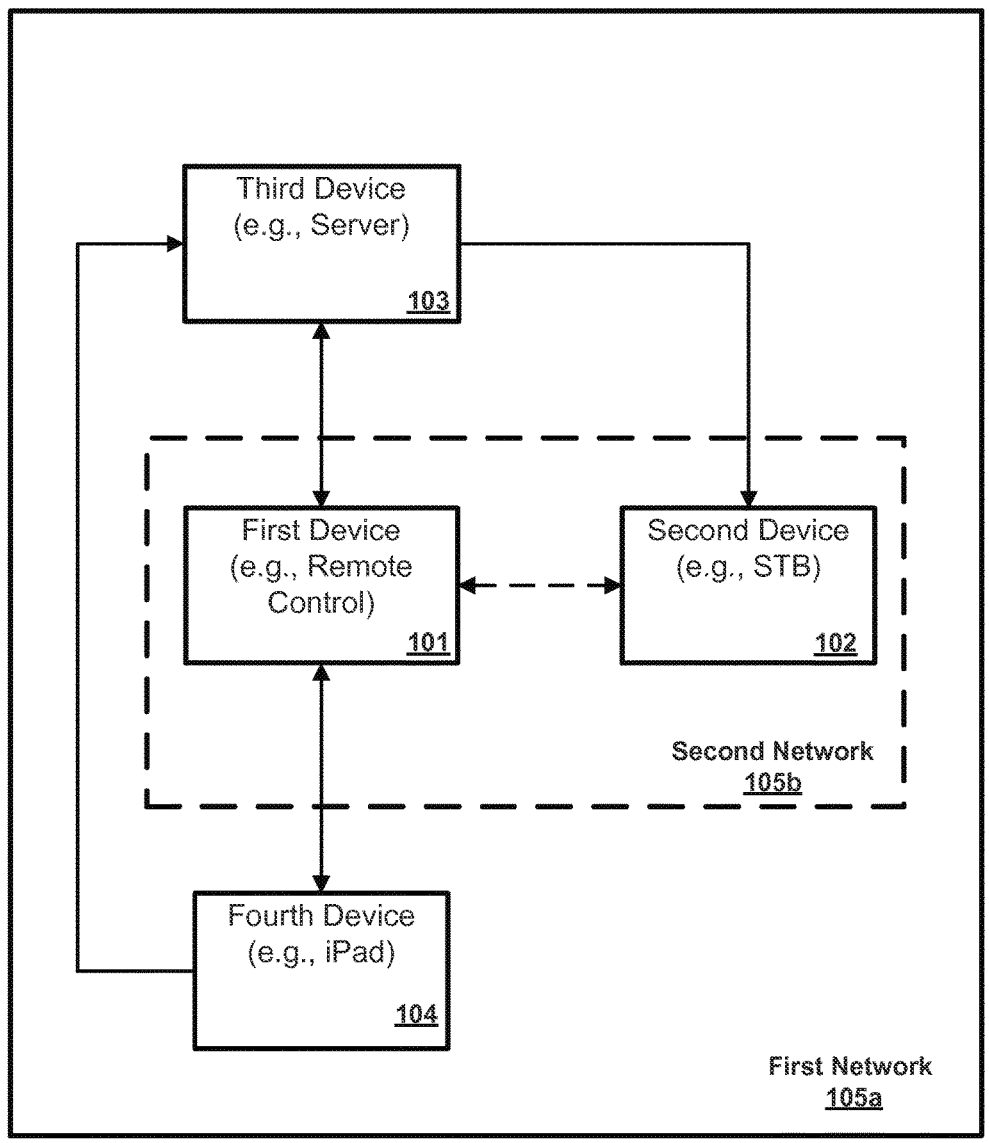
FIG. 1 is a block diagram of an exemplary system for managing network devices.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a", "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure is relates to systems and methods for managing network devices, wherein the network devices (e.g., a first device, a second device) can communicate via more than one type of network connection (e.g., a first network, a second network). In an aspect, a second device can receive a device identifier (e.g., a first network first device identifier, a second network first device identifier) of a first device via a first network, and receive the device identifier (e.g., a first network first device identifier, a second network first device identifier) of the first device via a second network. The second device can match the device identifier of the first device received via the first network and the device identifier of the first device received via the second network, and an association between the first device and the second device over the first network and the second network can be established. In another aspect, a first device can send a discovery request and receive ranking information for a plurality of second devices, wherein second devices are associated with respective device identifiers (e.g., first network second device identifiers, second network second device identifiers). The first device can then receive the device identifier of the highest ranking second device. Alternatively, the first device can transmit its device identifier to the highest ranking second device. The device identifier of the highest ranking second device can be matched with the device identifier of the first device, and the highest ranking second device and the first device can be paired. Any suitable identifier made up of letters, numbers, symbols, or a combination thereof can be used as a device identifier, for example, a MAC address, a serial number, an IP address, and the like.

In an aspect, upon pairing of the first device and the second device over a first network and a second network, communications between the first device and the second device over the first network and the second network can be associated. As an example, a user can make a first command (e.g., audio request of searching for particular channel) via the first device, and the first device can transmit the first command to a third device via the first network (e.g., an IP network). In an aspect, the third device can generate search results based on the first command, and transmit the search results to the second device via the first network. The search results can be displayed on the second device. The user can input a second command (e.g., push a plurality of buttons on the first device to select a search result) via the first device, and the first device can subsequently transmit a second command to the second device via the second network (e.g., RF4CE network).

FIG. 1 illustrates various aspects of an exemplary environment in which the present methods and systems can operate. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

In an aspect, an example system can comprise a plurality of devices, for example, a first device 101, a second device 102, a third device 103, and an optional fourth device 104. In an aspect, the first device 101, the second device 102, the third device 103 and the fourth device 104 can be configured to communicate via a first network 105a. For example, the first network 105a can be an interim protocol (IP) network. In another aspect, the first device 101 and the second device 102 can be configured to communicate via a second network 105b. As an example, the second network 105b can comprise one or more of RF4CE network, Bluetooth network, ZigBee network, RF network, Wi-Fi network, internet protocol (IP) network, and/or the like. In an aspect, the first device 101 can have a device identifier associated with the first network 105a (i.e., a first network first device identifier) and a device identifier associated with the second network 105b (i.e., a second network first device identifier). Similarly, the second device 102 can have a device identifier associated with the first network 105a (i.e., a first network second device identifier) and a device identifier associated with the second network 105b (i.e., second network second device identifier).

In an aspect, the first device 101 can be a control device and the second device 102 can be a target device that receives one or more commands from the first device 101 via the first network 105a and via the second network 105b. The third device 103 can be a computing device that facilitates communication between the first device 101 and the second device 102. As an example, the first device 101 can comprise a remote control, a computer, a smart phone, a tablet, a laptop, a PDA and the like. As another example, the second device 102 can comprise a television set-top box, an alarm system, a lighting system, a heating system, a ventilation system, a cooling system, and the like. The third device 103 can comprise one or more servers, routers, gateway systems, computers, network systems, and/or the like.

In an aspect, the second device 102 can receive a device identifier of the first device 101 (e.g., first network first device identifier and/or second network first device identifier) from the first device 101 via the first network 105a (e.g., an IP network). For example, the first device 101 can transmit the device identifier (e.g., first network first device identifier, second network first device identifier) to the third device 103 via the first network 105a, and the third device 103 can relay the device identifier to the second device 102 via the first network 105a (e.g., an IP network). In another aspect, the second device 102 can receive the device identifier (e.g., first network first device identifier, second network first device identifier) from the first device 101 via the second network 105b (e.g., RF4CE network). In an aspect, the device identifier of the first device 101 (e.g., first network first device identifier, second network first device identifier) can be transmitted from the first device 101 to the second device 102 via a discovery request. For example, when the first device 101 initiates a discovery request via a discovery service such as Bonjour or Universal Plug and Play (Upnp), the device identifier of the first device 101 (e.g., first network first device identifier, second network first device identifier) can be broadcast or unicast to the second device 102. In an aspect, the second device 102 can match the device identifier of the first device 101 received via the first network and the device identifier received via the second network. If the device identifier received via the first network 105a matches (e.g., identical, near identical) the device identifier received via the second network 105b, an association between the first device 101 and the second device 102 can be established. As an example, the first network first device identifier can be a MAC address of the first device 101 in an IP network. As another example, the second network first device identifier can be a MAC address of the first device 101 in a RF4CE network.

In an aspect, the first device 101 can be authenticated by the third device 103. For example, the first device 101 can provide user information (e.g., user identifier, password, key) to the third device 103. In an aspect, the first device 101 can transmit authentication information to the third device 103. In an aspect, the fourth device 104 can facilitate the authentication of the first device 101. For example, the fourth device 104 can identify the first device 101 via a discovery service such as Bonjour or Universal Plug and Play (Upnp). Upon discovery of the first device 101, the fourth device 104 can provide user information to the first device 101, and in turn, the first device 101 can provide the user information (e.g., a user identifier, password, key, login credential) to the third device 103 for authentication. Alternatively, the fourth device 104 can transmit user information (e.g., a user identifier, password, key) to the third device 103 on behalf of the first device 101. For example, the fourth device 104 can be used as an input device for a user to provide user information (e.g., a user identifier, password, key, login credential). The fourth device 104 can transmit the user information to the third device 103 and the first device 101.

In an exemplary scenario, the first device 101 can be a voice enabled remote control. The second device 102 can be a television set top box. When the first device 101 is associated with the second device 102 via the first network 105a and via the second network 105b, the first device 101 can transmit a first command to the second device 102 via the first network 105a (e.g., IP network), and transmit a second command to the second device 102 via a second network 105b (e.g., radio frequency network). As an example, the first command can comprise a audio request from a user to search for a particular channel, a particular type of content, access particular content at a specific time line (e.g., skip 10 minutes, skip advertisement, etc.), and the like. As another example, the second command can comprise making a selection (e.g., tuning to a particular channels or content) from search results generated based on the first command, using one or more buttons on the first device 101.

In an aspect, the first device 101 (e.g., voice enabled remote control) can digitize the audio request and transmit the digitized audio request in IP packets to the third device 103 via the first network 105a (e.g., IP network). Upon receiving the audio request, the third device 103 can generate search results based on the audio request and transmit the search results to the second device 102 (e.g., television set top box). In an aspect, the search results can be displayed on a display device connected to the second device 102. In another aspect, the search results can comprise a synthesized voice read out of the search results. When the search results are available, the first device 101 can transmit a radio frequency (RF) command to the second device 102. For example, after the search results are displayed, the first device 101 can send a RF command to the second device 102 via one or more buttons on the first device 101 to make a selection (e.g., tune to a particular channel) based on the search results.

Figure 2:
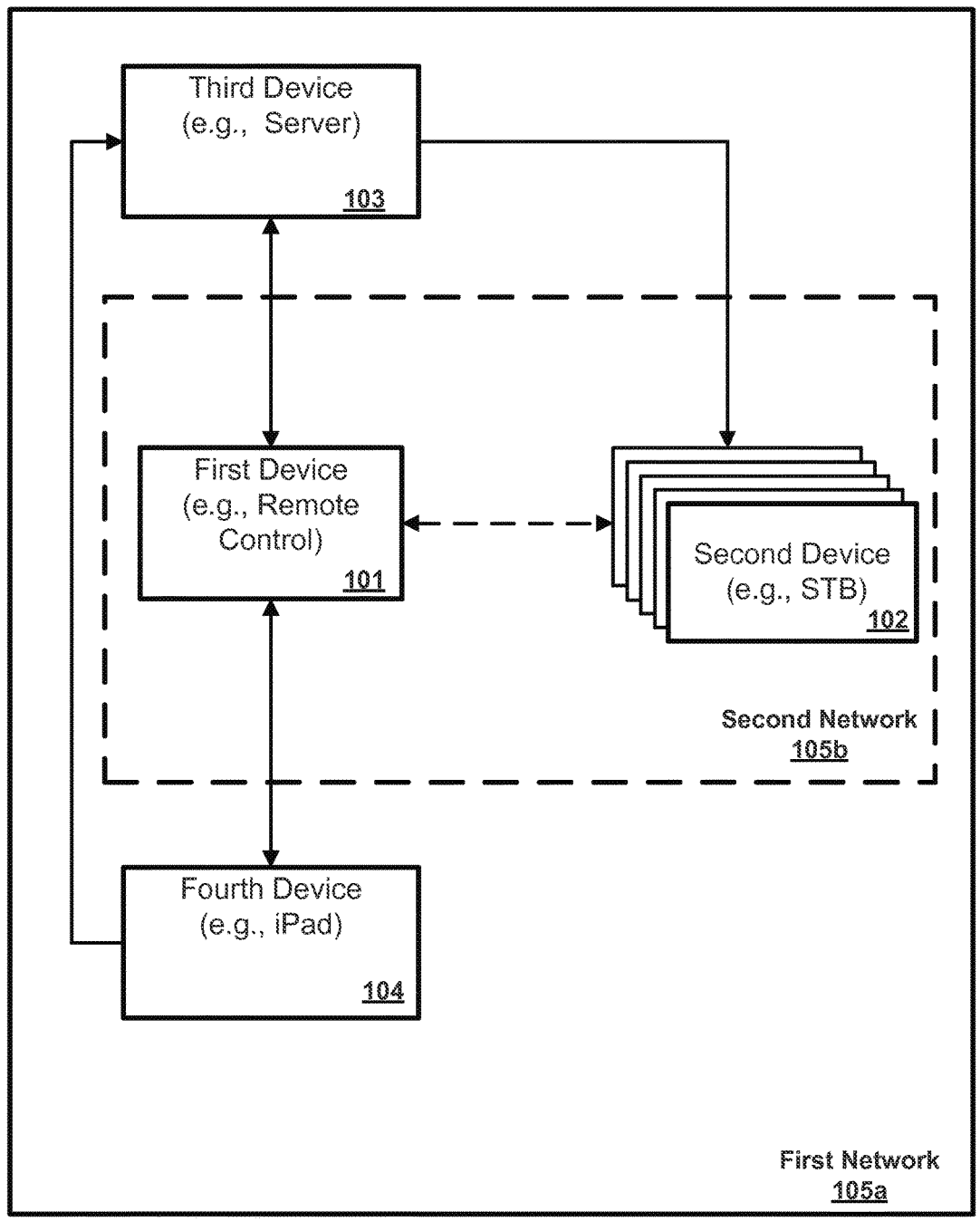
FIG. 2 is a block diagram of another exemplary system for managing network devices.

FIG. 2 illustrates various aspects of another exemplary environment in which the present methods and systems can operate. In an aspect, the first device 101 can send a discovery request and receive ranking information of a plurality of second devices. For example, the plurality of second devices can be ranked based on line of sight, received signal strength indicator (RSSI) of the respective plurality of second devices, whether the respective plurality of second devices have been previously paired with the first device 101, whether the respective plurality of second devices are turned on in a predefined time or time period, number of first devices the respective plurality of second devices can be paired with, and/or the like. In an aspect, device identifiers (e.g., first network second device identifiers, second network second device identifiers) of the respective plurality of second devices 102 can be stored in the third device 103. The first device 101 can receive a device identifier (e.g., first network second device identifier, second network second device identifier) of the highest ranking second device 102 from the third device 103. Alternatively, the first device 101 can transmit its device identifier (e.g., a first network first device identifier, a second network first device identifier) to the highest ranking second device 102. If the device identifier (e.g., a first network device identifier, a second network device identifier) of the first device 101 matches the device identifier (e.g., first network device identifier, second network device identifier) of the highest ranking second device, the first device 101 can be paired with the highest ranking second devices 102. For example, the first device 101 can comprise a database for storing device identifiers (e.g., first network second device identifiers, second network second device identifiers) of second devices capable of pairing with the first device 101. When the first device 101 receives a device identifier (e.g., first network second device identifiers, second network second device identifiers) of the highest ranking second device, the first device 101 can compare the received device identifier of the highest ranking second device with the device identifiers in its database, and if a matching (e.g., identical, near identical) device identifier can be found in its database, the first device 101 and the highest ranking second device 102 can be paired. In another aspect, each of the plurality of second devices can have a respective database for storing device identifiers (e.g., first network first device identifiers, second network first device identifiers) of first devices capable for pairing. When the highest ranking second device 102 receives a device identifier of the first device 101, the highest ranking second device 102 can compare the received device identifier of the first device 101 with the device identifiers in its database, and if a matching identifier (e.g., identical, nearly identical) can be found in the database of the highest ranking second device 102, the first device 101 and the highest ranking second devices 102 can be paired. In an aspect, a user can validate the highest ranking second device, for example, by providing a validation code on the first device 101. In an aspect, if pairing between the first device 101 and the highest ranking second device is not successful, a next highest ranking second device can be used for pairing with the first device 101. In an aspect, pairing can be unsuccessful if the validation code is not received within a predefined time period. In another aspect, pairing can be cancelled by a user, for example, via the first device 101.

Figure 3:
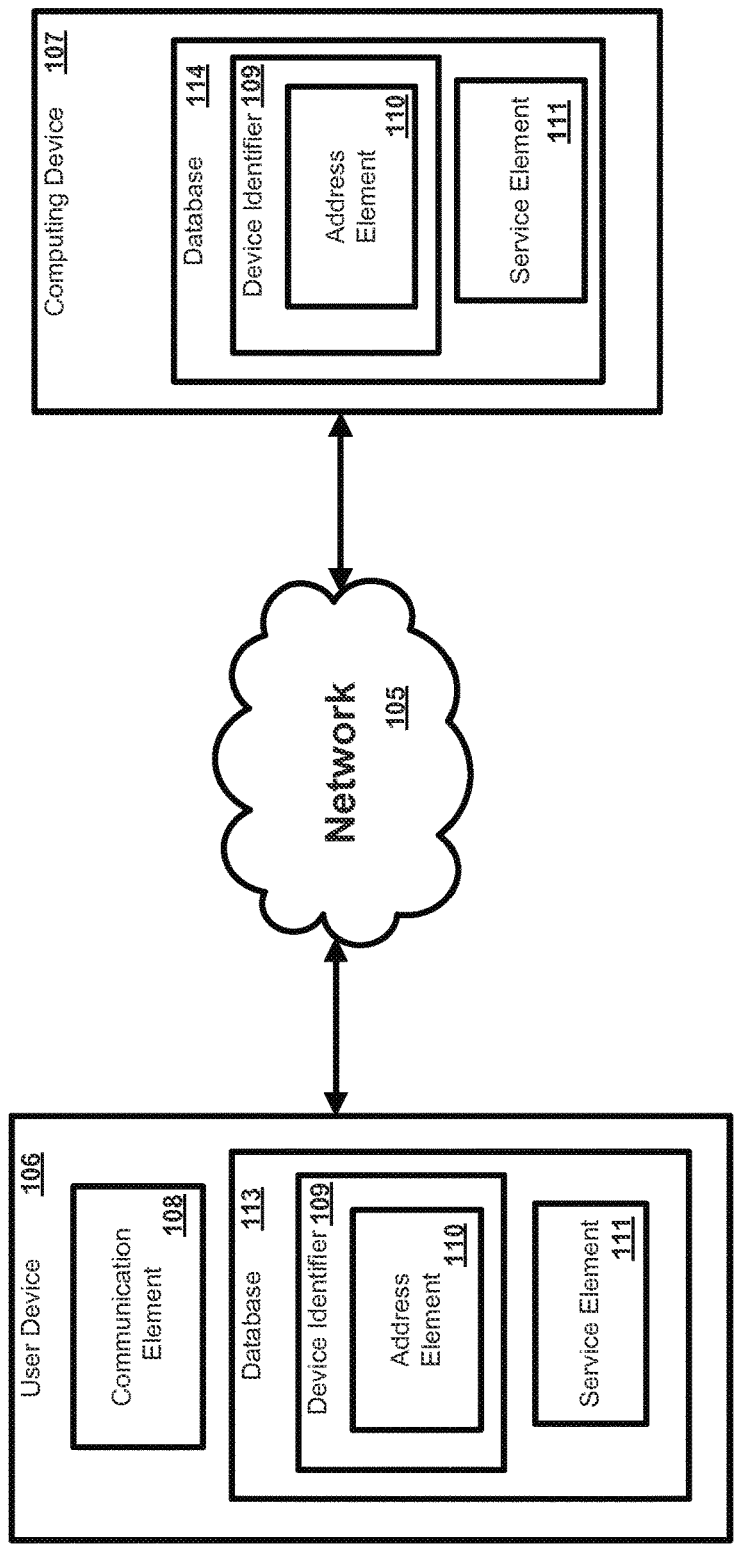
FIG. 3 is a block diagram of an exemplary network device management system in which the present methods and systems can operate.

FIG. 3 is a block diagram of an exemplary network device management system in which the present methods and systems can operate. In one aspect of the disclosure, a system can be configured to provide services, such as network-related services to a user device. The network and system can comprise a user device 106 in communication with a computing device 107, such as a server. The computing device 107 can be disposed locally or remotely relative to the user device 106. As an example, the user device 106 and the computing device 107 can be in communication via a private and/or public network 105. In one aspect, the network 105 can comprise a packet switched network (e.g., an internet protocol based network), a non-packet switched network (e.g., a quadrature amplitude modulation based network), and/or the like. As an example, the network 105 can comprise one or more internet protocol network, quadrature amplitude modulation based network, RF4CE network, Bluetooth network, ZigBee network, RF network, Wi-Fi network and the like. The network 105 can comprise network adapters, switches, routers, and the like connected through wireless links (e.g., radio frequency, satellite) and/or physical links (e.g., fiber optic cable, coaxial cable, Ethernet cable).

In an aspect, the user device 106 can be the first device 101 in FIG. 1 and FIG. 2. As an example, the user device 106 can comprise a computer, a remote control, a smartphone, a laptop, a tablet, a gaining console, or other device capable of communicating with the computing device 107. In an aspect, the computing device 107 can be the second device 102 or the third device 103 in FIG. 1 and FIG. 2. As an example, the computing device 107 can comprise a computer, a gateway system, a smartphone, a television set-top box, an alarm system, a lighting system, a heating system, a ventilation system, a cooling system, and the like.

In an aspect, the user device 106 can comprise a communication element 108 for providing an interface to a user to interact with the user device 106 and/or the computing device 107. The communication element 108 can be any interface for presenting and/or receiving information to/from the user, such as user feedback. For example, the communication element 108 can comprise a voice interface configured to receive and process a voice command from a user. As another example, the communication element 108 can comprise one or more control buttons for a user to input a command. Other software, hardware, and/or interfaces can be used to provide communication between the user and one or more of the user device 106 and the computing device 107. As an example, the communication element 108 can request or query various files and/or services from a local source and/or a remote source. As a further example, the communication element 106 can transmit data (e.g., device identifier, voice command) to a local or remote device, such as the computing device 107.

In an aspect, the user device 106 and the computing device 107 each can be associated with one or more respective device identifiers 109. As an example, the device identifier 109 can be any identifier, token, character, string, or the like, for differentiating one user or device from another user or user device. In a further aspect, the device identifier 109 can identify a user or user device as belonging to a particular class of users or user devices. As a further example, the device identifier 109 can comprise information relating to the user device, such as a manufacturer, a model or type of device, a service provider associated with a device, a state of a device, a locator, and/or a label or classifier. Other information can be represented by the device identifier 109. In an aspect, the device identifier 109 can be broadcast by the user device 106 via a discovery request (e.g., a request via Bonjour service or UPnP service). In another aspect, the device identifier 109 can be transmitted when a device pairing application is executed. In another aspect, the device identifiers 109 can be compared and/or matched in a device pairing process.

In an aspect, the device identifier 109 can comprise an address element 110 and a service element 111. In an aspect, the address element 110 can comprise or provide an internet protocol address, a network address, a media access control (MAC) address, an Internet address, or the like. As an example, the address element 110 can be relied upon to establish an association between the user device 106 and the computing device 107 or other devices and/or networks. As a further example, the address element 110 can be used as an identifier or locator of a device (e.g., user device 106, computing device 107). In an aspect, the address element 110 can be persistent for a particular network. For example, the user device 106 can have a first network address element (e.g., MAC address in IP network) and second network address element (e.g., MAC address in RF4CE network). In an aspect, the address element 110 can be broadcast by the user device 106 via a discovery request. In another aspect, the address element 110 can be transmitted when a device pairing application is executed. In another aspect, the address element 110 can be compared and/or matched in a device pairing process.

In an aspect, the user device 106 can be associated with respective service element 111. The service element 111 can comprise an identification of a service provider associated with the user device 106 and/or with the class of user device 106. The class of user device 106 can be related to a type of device, capability of device, type of service being provided, and/or a level of service (e.g., business class, service tier, service package, etc.). As an example, the service element 111 can comprise information relating to or provided by a communication service provider (e.g., Internet service provider) that is providing or enabling data flow such as communication services to the user device 106. As a further example, the service element 111 can comprise information relating to a preferred service provider for one or more particular services relating to the user device 106. In an aspect, the address element 110 can be used to identify or retrieve data from the service element 111, or vise versa. As a further example, one or more of the address element 110 and the service element 111 can be stored remotely from the user device 106 and retrieved by one or more devices, such as the user device 106 and/or the computing device 107. Other information can be represented by the service element 111.

In an aspect, the computing device 107 can be a server for communicating with the user device 106. As an example, the computing device 107 can communicate with the user device 106 for providing data and/or services. As an example, the computing device 107 can provide services, such as data management, network (e.g., Internet) connectivity, network printing, media management (e.g., media server), content services, streaming services, broadband services, or other network-related services. In an aspect, the computing device 107 can allow the user device 106 to interact with one or more remote devices. For example, the computing device 107 can store device identifiers of devices capable of pairing with the user device 106. As another example, the computing device 107 can generate search results based on a voice command received from the user device 106. As an example, the computing device 107 can be configured as (or disposed at) a central location (e.g., a headend, or processing facility), which can receive content (e.g., data, input programming) from multiple sources. The computing device 107 can combine the content from the multiple sources and can distribute the content to user (e.g., subscriber) locations via a distribution system.

In an aspect, the computing device 107 can be associated with a database 114. As an example, the database 114 can store a plurality of files (e.g., web pages), device identifiers, user identifiers or records, or other information. Other information can be stored in the database 114. In an aspect, the database 114 can store information such as the device identifier 109, address element 110 and/or the service element 111 of the user device 106 or other network devices (not shown) on the network 105. In an aspect, the user device 106 can request and/or retrieve a file from the database 114. For example, the user device 106 can retrieve the device identifier 109 of the computing device 107 and/or other network devices on the network 105 from the database 114. In an aspect, the computing device 107 can obtain the device identifier 109 of a specific device (e.g., the user device 106) on the network 105 and retrieve the respective address element 110 and/or service element 111 from the database 114, or vice versa. The database 114 can be disposed remotely from the computing device 107 and accessed via direct or indirect connection. The database 114 can be integrated with the computing device 107 or some other device or system.

In an aspect, the user device 106 can be associated with a database 113. As an example, the database 113 can store a plurality of files (e.g., web pages), device identifiers, user identifiers or records, or other information. For example, device identifier 109 of the user device 106, the computing device 107 or other devices on the network 105 can be stored in database 113 for subsequent retrieval and/or comparison. In an aspect, user information can be stored in the database 113 for user of the user device 106 to be authenticated. As an example, user information can comprise a user identifier, a password or key associated with a service (e.g., service element 111). In an aspect, the user device 106 and the computing device 107 can communication by retrieving, sending, receiving and comparing data between database 113 and database 114. For example, in a device pairing process, the user device 106 can retrieve a device identifier 109 of another network device from database 114 and identify a matching device identifier 109 in the database 113.

It should be noted the present disclosure can be applicable in any network environment employing a computing device, a server, a user device or other network entity that is involved in the management of communications between devices on the network. In order to facilitate an understanding of the disclosure, particular examples of network environments are described herein. However, the present disclosure is not limited thereto and is equally applicable to other analogous network environments as will be readily apparent to those skilled in the art from the description provided herein.

Figure 4:
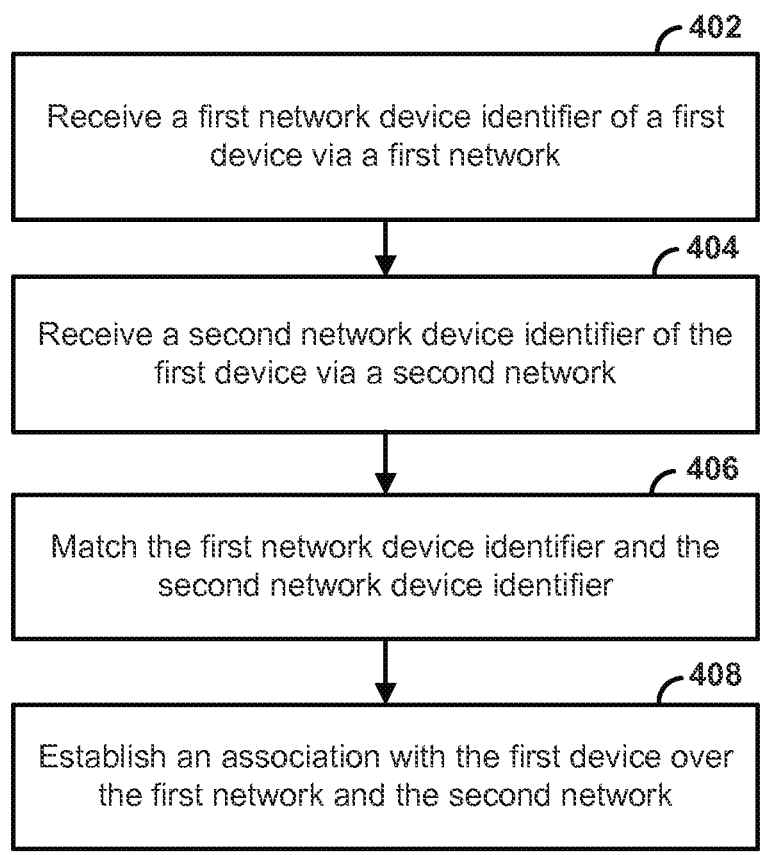
FIG. 4 is flowchart illustrating an example method for managing network devices.

FIG. 4 is a flow chart illustrating an example method for managing network devices. At step 402, a device identifier of a first device 101 can be received via a first network. In an aspect, the second device 102 can receive a device identifier of the first device 101 from the first device 101 via the first network 105a. As an example, the first device 101 can be a control device and the second device 102 can be a target device that receives one or more control commands from the first device 101 via the first network 105a. As an example, the first device 101 can comprise a remote control, a computer, a smart phone, a tablet, a laptop, a PDA and the like. As another example, the second device 102 can comprise a television set-top box, an alarm system, a lighting system, a heating system, a ventilation system, a cooling system, and the like. As an example, the first network 105a can comprise an IP network.

In an aspect, the device identifier of the first device 101 can be a device identifier of the first device 101 associated with the first network 105a (e.g., a first network first device identifier). For example, the first network first device identifier can comprise a MAC address of the first device 101 in the first network 105a (e.g., an IP network). In another aspect, the device identifier of the first device 101 can be a device identifier of the first device 101 associated with the second network (e.g., a second network first device identifier). For example, the second network first device identifier can comprise a MAC address of the first device 101 in the second network 105b (e.g., a RF4CE network). In an aspect, the first device 101 can activate and/or execute a device pairing application installed on the first device 101, and the activation and/or execution of the device paring application can trigger the transmission of a device identifier of the first device 101 (e.g., a first network first device identifier, a second network first device identifier) to the second device 102. In an aspect, the device identifier of the first device can be transmitted from the first device 101 to the third device 103, and the third device 103 can relay the device identifier of the first device 101 to the second device 102. As an example, the third device 103 can comprise a server, a router, a gateway system, a computer, a network system, and the like.

In an aspect, the first device 101 can be authenticated by the third device 103. For example, the first device 101 can provide user information (e.g., a user identifier, password, key) to the third device 103. Alternatively, the fourth device 104 can be used to facilitate authentication of the first device 101. For example, the fourth device 104 can identify the first device 101 via a discovery service such as Bonjour or UPnP. In an aspect, the fourth device 104 can provide user information to the first device 101, and in turn, the first device 101 can provide the user information to the third device 103 for authentication. In another aspect, the fourth device 104 can provide the user information to the third device 103 on behalf of the first device 101. By way of example, the fourth device 104 can be an electronic device, such as a computer, a smart phone, a tablet, a laptop, a PDA and the like.

At step 404, the device identifier of the first device can be received via a second network. In an aspect, the second device 102 can receive the device identifier of the first device 101 (e.g., first network first device identifier, second network first device identifier) from the first device 101 via the second network 105b. In an aspect, the device identifier of the first device 101 can be transmitted from the first device 101 to the second device 102 via a discovery request through a discovery service such as Bonjour or Upnp. In another aspect, the first device 101 can transmit the device identifier via an IP home network, such as a LAN. For example, when the first device 101 initiates a discovery request, the device identifier of the first device 101 can be broadcast (or otherwise transmitted) from the first device 101 to the second device 102. As another example, the device identifier of the first device 101 can be unicast from the first device 101 to the second device 102. In another aspect, the first device 101 can transmit the device identifier of the first device 101 (e.g., first network first device identifier, second network first device identifier) to the second device 102 via the second network 105b by activating and/or executing a device pairing application installed on the first device 101. For example, the first network first device identifier can comprise a MAC address of the first device 101 in the first network 105a (e.g., an IP network). As another example, the second network first device identifier can comprise a MAC address of the first device 101 in the second network 105b (e.g., a RF4CE network). In an aspect, the step 402 and step 404 can occur simultaneously.

At step 406, the device identifier received via the first network and the device identifier received via the second network can be compared, associated, or matched. As an example, the second device 102 can compare the device identifier received via the first network 105a and the device identifier received via the second network 105b. As an example, the device identifier received via the first network 105a and the device identifier received via the second network 105b can both be the MAC addresses of the first device 101 in the first network 105a (e.g., an IP network). As an example, the device identifier received via the first network 105a and the device identifier received via the second network 105b can both be the MAC addresses of the first device 101 in the second network 105b (e.g., a RF4CE network). In an aspect, if the device identifier received via the first network 105a and the device identifier received via the second network 105b are identical or near identical, they can be matched. In another aspect, if the device identifier received via the first network 105a and the device identifier received via the second network 105b are received within a predefined time period e.g., 30 seconds), they can be matched.

At step 408, an association with the first device over the first network and the second network can be established. In an aspect, when an association between the first device 101 and the second device 102 is established, the first device 101 (e.g., a remote control) can have the ability to control the second device 102 (e.g., a television set-top box, an alarm system, a lighting system, a heating system, a ventilation system, a cooling system) via the first network 105a (e.g., an IP network) and via the second network 105b (e.g., a RF4CE network). As an example, the control ability can comprise remote tuning a set-top box, ordering premium content via the second device, sharing pictures and other content, accessing security features, setting temperatures, and the like via the first network 105a or the second network 105b.

In an aspect, the first device 101 can be associated with the second device 102 using a pre-commissioning feature of a multi-system operator (MSO) profile. As an example, the first device 101 (e.g., a remote control) can transmit a discovery request to a plurality of second devices 102 (e.g., a plurality of set top boxes). In the response to the discovery request, the plurality of second devices 102 can be ranked. In an aspect, the highest ranking second device 102 can be selected to associate with the first device 101. In another aspect, the highest ranking second device 102 that has been previously matched to the first device 101 can be selected to associate with the first device 101. In an aspect, the association between the first device 101 and the second device 102 can be automatic without user validation.

In an aspect, when an association between the first device 101 and the second device 102 is established, the communication between the first device 101 and the second device 102 via the first network 105a (e.g., an IP network) and via the second network 105b (e.g., a RF4CE network) can be associated. In an exemplary scenario, when the first device 101 is associated with the second device 102, the first device 101 (e.g., a voice enabled remote control) can transmit a first command (e.g., a voice command) to the second device 102 (e.g., set top box) via the first network 105a (e.g., an IP network), and transmit a second command (e.g., a radio frequency command) to the second device 102 via a second network 105b (e.g., a radio frequency network). In an aspect, the voice command can comprise an audio request from a user to search for a particular channel, a particular type of content, access particular content at a specific time line (e.g., skip 10 minutes, skip advertisement). In another aspect, the radio frequency command can comprise making a selection using one or more buttons on the first device 101 based on the search results requested by the voice command. As such, the first command (e.g., a voice command) and the second command (e.g., a radio frequency command) can be combined for the first device 101 to control the second device 102.

In an aspect, when an association between the first device 101 and the second device 102 is established, a pairing link can be stored in a database (e.g., database 113) associated with the first device 101 and in a database (e.g., database 114) associated with the second device 102. In an aspect, the pairing link can comprise device identifiers e.g., device identifier 109) and/or network addresses (e.g., address element 110) of the successfully paired devices. In an aspect, the pairing link can minimize the burden of retrieving and/or matching device identifier 109 in a future pairing attempt.

Figure 5:
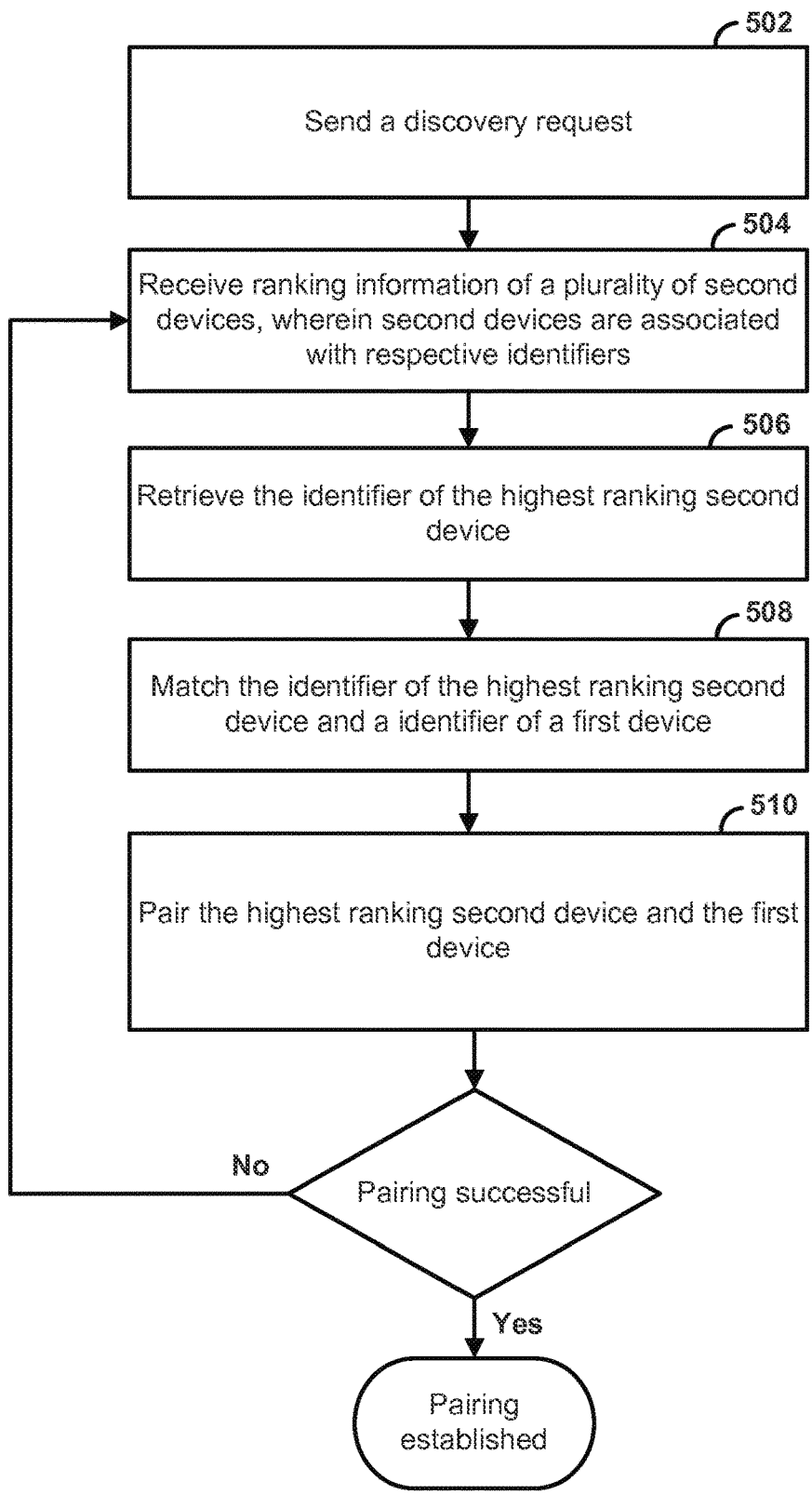
FIG. 5 is a flowchart illustrating another example method for managing network devices.

FIG. 5 is another flow chart illustrating an example method for managing network devices. At step 502, a discovery request can be sent. As an example, the discovery request can be made by the first device 101 via a discovery service such as Bonjour or UPnP. In an aspect, a plurality of second devices (e.g., set top boxes) can be identified in response to the discovery request. The discovery request can allow the first device 101 and the identified plurality of second devices to establish communications and share data (e.g., device identifier 109, address element 110, service element 111, device capabilities, location, etc.).

At step 504, ranking information of the plurality of second devices can be received. In an aspect, ranking information can be obtained using a multi system operator (MSO) profile stored in the first device 101. For example, the plurality of second devices can be ranked based on line of sight, received signal strength indicator (RSSI) of the respective plurality of second devices, whether the respective plurality of second devices are turned on in a predefined time or time period, whether the respective plurality of second devices have been previously paired with the first device 101, number of first devices the respective plurality of second devices can be paired with, and/or the like. In an aspect, the first device 101 and the second device 102 can be equipped with position sensors such as a global positioning system (GPS) device. As such, the plurality of second devices can be ranked based on the position of the first device 101 and the plurality of second devices. For example, the second device closest to the first device 101 can be the highest ranking second network device. In an aspect, a second device that is more than a predetermined distance away from the first device 101 can be excluded from ranking. In an aspect, the plurality of second devices 102 can respond to a plurality of discovery requests from a plurality of first devices 101. Accordingly, the plurality of second devices 102 can be ranked in response to the plurality of discovery requests from the respective plurality of first devices 101. If a particular second device 102 (e.g., a set top box) intends to pair with a particular first device 101 (e.g., a remote control), the particular second device 102 can rank itself the highest among the plurality of second devices 102 in response to a discovery request from the particular first device 101.

In an aspect, the user of the first device 101 can manually select the highest ranking second device for a subsequent pairing attempt. In another aspect, the highest ranking second device 102 can be selected automatically without a user operation.

At step 506, the device identifier of the highest ranking second device can be received. In an aspect, the second devices can be associated with respective device identifiers (e.g., first network second device identifiers, second network second device identifiers). In an aspect, the device identifier of the highest ranking second device can be received by the first device 101. In an aspect, the device identifiers (e.g., first network second device identifiers, second network second device identifiers) of the plurality of second devices can be stored in a database of the third device 103. The first device 101 can retrieve a device identifier (e.g., a first network second device identifier, a second network second device identifier) of the highest ranking second device from the third device 103. In an aspect, the first device 101 can provide user information (e.g., user identifier, password, key) to the third device 103 to retrieve a device identifier (e.g., a first network second device identifier, a second network second device identifier) of the highest ranking second device 102. In an aspect, a database (e.g., database 113) associated with the first device 101 can store information (e.g., device identifier, address element, service element, device type, etc.) of a list of second devices that have been successfully paired with the first device 101. If the highest ranking second device can be found in the database (e.g., database 113), a device identifier of the highest ranking second device (e.g., first network second device identifier, second network second device identifier) can be retrieved from the database (e.g., database 113).

At step 508, the identifier of the highest ranking second device and an identifier of a first device can be matched. In an aspect, a database (e.g., database 113) of the first device 101 can store a list of second devices capable of pairing with the first device 101. Device information associated with the respective second device can also be stored in the database. As an example, the device information can comprise one or more device identifiers, device capabilities, device locations, and the like. Upon receiving a device identifier (e.g., a first network second device identifier, a second network second device identifier) of the highest ranking second device, the first device 101 can access a database (e.g., database 113) to identify a matching (e.g., identical, near identical) device identifier. If a matching (e.g., identical, nearly identical) device identifier can be found in a database, the device identifier of the highest ranking second device and an identifier of a first device 101 can be matched. In an aspect, the database can be a remote database. In another aspect, the database can be a database located in the first device 101.

At step 510, the highest ranking second device and the first device can be paired. In an aspect, a device pairing application executing on the first device 101 can prompt the user of the first device 101 for approval of pairing with the second device 102. In an aspect, the pairing can be temporary. If the user of the first device 101 declines the pairing or if a predetermined time period expires before the user of the first device 101 responds to approval of the pairing, the pairing is not successful. In response to an unsuccessful pairing, the methods can proceed to step 506, wherein the device identifier (e.g., a first network second device identifier, a second network second device identifier) of the next highest ranking second device can be received. In another aspect, the approval for pairing can be automatic when the device identifier of the highest ranking second device 102 and an identifier of a first device 101 are matched. In another aspect, pairing can be cancelled by a user, for example, via the first device 101.

When the first device 101 and the second device 102 (e.g., a highest ranking second device) are paired, the communication between the first device 101 and the second device 102 via the first network 105a (e.g., an IP network) and via the second network 105b (e.g., a RF4CE network) can be associated. As such, the first device 101 (e.g., a remote control) can have the ability to control the second device 102 (e.g., a television set-top box, an alarm system, a lighting system, a heating system, a ventilation system, a cooling system) via the first network 105a (e.g., an IP network) and via the second network 105b (e.g., a RF4CE network). As an example, the control ability can comprise remote tuning a set-top box, ordering premium content via the second device, sharing pictures and other content, accessing security features via the first network 105a or via the second network 105b. In an aspect, pairing between the first device 101 and the second device 102 can be terminated at any time. For example, the first device 101 may need to pair with a different second device (e.g., a set-top box) to access a specific content. As another example, the first device 101 may need to pair with a different second device (e.g., a heating system) to set a temperature.

In an exemplary scenario, when the first device 101 is paired with the second device 102, the first device 101 (e.g., a voice enabled remote control) can transmit a first command (e.g., a voice command) to the second device 102 (e.g., a set top box) via the first network 105a (e.g., an IP network), and transmit a second command (e.g., a radio frequency command) to the second device via a second network 105b (e.g., a radio frequency network). In an aspect, the voice command can comprise an audio request to search for a particular channel, a particular type of content, access particular content at a specific time line (e.g., skip 10 minutes, skip advertisement). In another aspect, the radio frequency command can comprise making a selection using one or more buttons on the first device 101 based on the search results requested by the voice command. As such, when the first device 101 and the second device 102 are successfully paired, the first command (e.g., a voice command) via the first network 105a and the second command (e.g., a radio frequency command) via the second network 105b can be combined for the first device 101 to control the second device 102.

In an aspect, when an association between the first device 101 and the second device 102 is established, a pairing link can be stored in a database (e.g., database 113) associated with the first device 101 and in a database (e.g., database 114) associated with the second device 102. The pairing link can facilitate future pairing. In an aspect, the pairing link can comprise device identifiers (e.g., device identifier 109) or network addresses (e.g., address element 110) of the successfully paired devices, thereby minimizing the burden of retrieving and/or matching device identifier 109 in future pairing attempt.

Figure 6:
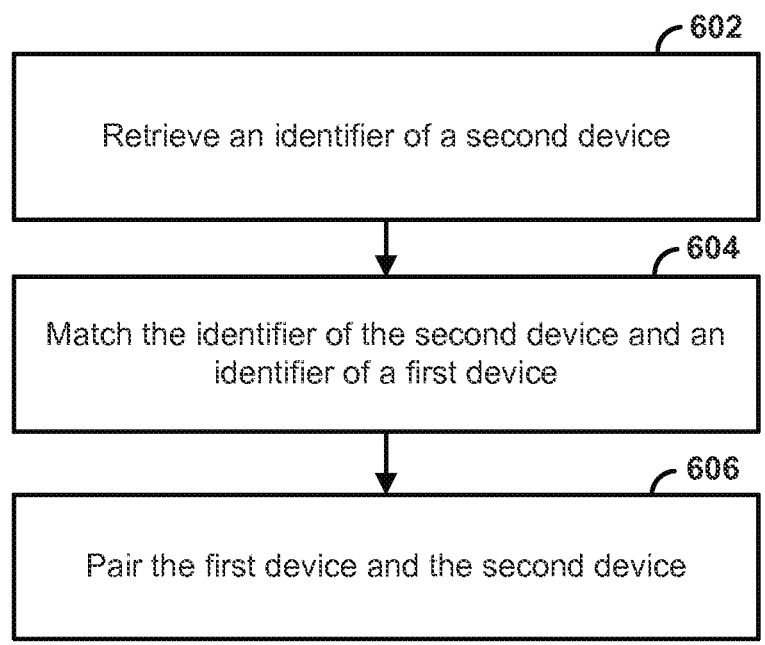
FIG. 6 is a flowchart strafing yet another example method for managing network devices.

FIG. 6 is another flow chart illustrating an example method for managing network devices. At step 602, a device identifier of a second device can be received, for example, by a first device 101. In an aspect, the device identifier of the second device 102 can be stored in a database (e.g., database 114) of a third device 103. For example, the first device 101 can retrieve a device identifier of a second device 102 (e.g., a first network second device identifier, a second network second device identifier) from the third device 103. In an aspect, the first device 101 can provide user information (e.g., user identifier, password, key) to the third device 103 in order to receive a device identifier of the second device 102 (e.g., a first network device identifier, a second network device identifier).

In an exemplary scenario, a plurality of second devices within a predefined distance from the first device 101 can be displayed on the first device 101. The user of the first device 101 can select a specific second device from the plurality of displayed second devices. The user selection can trigger retrieval of a device identifier of the selected second device 102 (e.g., a first network second device identifier, a second network second device identifier) from the third device 103.

At step 604, the device identifier of the second device and a device identifier of a first device can be matched. In an aspect, a database (e.g., database 113) of the first device 101 can store a list of second devices capable of pairing with the first device 101. Device information associated with the respective second device can also be stored in the database (e.g., database 113). As an example, the device information can comprise device identifiers (e.g., first network second device identifiers, second network second device identifiers), device capabilities, device locations, and the like of the second devices capable of pairing with the first device 101. Upon obtaining a device identifier of the selected second device, the first device 101 can access its database (e.g., database 113) to identify a matching (i.e., identical, nearly identical) device identifier. If a matching device identifier can be found in the database (e.g., database 113) of the first device 101, the device identifier of the selected second device 102 and a device identifier of a first device 101 can be matched.

At step 606, the first device and the second device can be paired. In an aspect, pairing the first device 101 and the second device 102 can comprise the first device 101 providing a device identifier of the first device 101 (e.g., first network first device identifier, second network first device identifier) to the second device 102. In another aspect, pairing the first device 101 and the second device 102 can comprise the first device 101 providing user information to the second device 102. For example, user information can comprise a user identifier, a password, a code, a key, or other secret information. As an example, upon receiving the user information and/or a device identifier of the first device 101 (e.g., first network first device identifier, second network first device identifier), the first device 101 and the second device 102 can be paired by a device pairing application. In an aspect, the user information and/or a device identifier of the first device 101 can be broadcast to a plurality of second devices 102. In another aspect, the user information and/or a device identifier of the first device 101 can be unicast to the second device 102 that the first device 101 intends to pair with.

In an aspect, the first device 101 and the second device 102 can be paired using a pre-commissioning feature of a multi system operator (MSO) profile. As an example, the first device 101 (e.g., a remote control) can transmit a discovery request to a plurality of second devices 102 (e.g., a plurality of set top boxes). In the response to the discovery request, the plurality of second devices 102 can be ranked. In an aspect, the highest ranked second device 102 can be selected to associate with the first device 101. In another aspect, the highest ranked second device 102 that has been previously matched to the first device 101 can be selected to associate with the first device 101. In an aspect, the association between the first device 101 and the second device 102 can be automatic without user validation.

In an aspect, the plurality of second devices 102 can be ranked based on line of sight, received signal strength indicator (RSSI) of the respective plurality of second devices, whether the respective plurality of second devices are turned on in a predefined time or time period, whether the respective plurality of second devices have been previously paired with the first device 101, number of first devices the respective plurality of second devices can be paired with, and/or the like.

Figure 7:
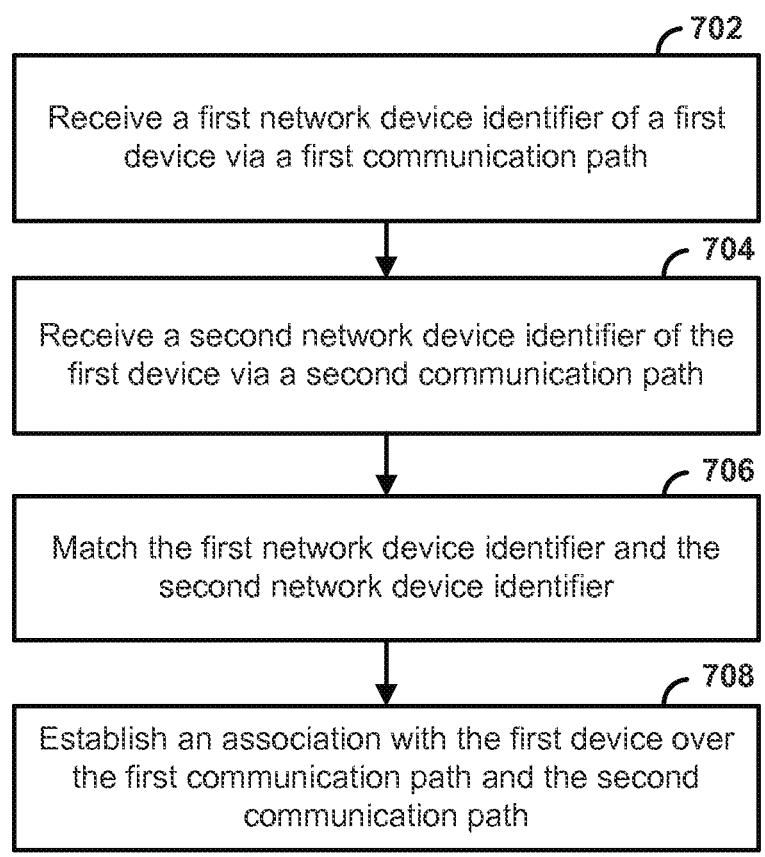
FIG. 7 is a flowchart, illustrating yet another example method for managing network devices.

FIG. 7 is a flow chart illustrating an example method for managing network devices. At step 702, a device identifier of a first device 101 can be received via a first communication path. In an aspect, the second device 102 can receive a device identifier of the first device 101 from the first device 101 via a first communication path in a network (e.g., IP network, RF4CE network, etc.). As an example, the first device 101 can be a control device and the second device 102 can be a target device that receives one or more control commands from the first device 101 via the first communication path. As an example, the first device 101 can comprise a remote control, a computer, a smart phone, a tablet, a laptop, a PDA and the like. As another example, the second device 102 can comprise a television set-top box, an alarm system, a lighting system, a heating system, a ventilation system, a cooling system, and the like.

In an aspect, the first device 101 can activate and/or execute a device pairing application installed on the first device 101, and the activation and/or execution of the device paring application can trigger the transmission of a device identifier of the first device 101 to the second device 102. In an aspect, the device identifier of the first device can be transmitted from the first device 101 to the third device 103, and the third device 103 can relay the device identifier of the first device 101 to the second device 102. As an example, the third device 103 can comprise a server, a router, a gateway system, a computer, a network system, and the like.

In an aspect, the first device 101 can be authenticated by the third device 103. For example, the first device 101 can provide user information (e.g., a user identifier, password, key) to the third device 103. Alternatively, the fourth device 104 can be used to facilitate authentication of the first device 101. For example, the fourth device 104 can identify the first device 101 via a discovery service such as Bonjour or UPnP. In an aspect, the fourth device 104 can provide user information to the first device 101, and in turn, the first device 101 can provide the user information to the third device 103 for authentication. In another aspect, the fourth device 104 can provide the user information to the third device 103 on behalf of the first device 101. By way of example, the fourth device 104 can be an electronic device, such as a computer, a smart phone, a tablet, a laptop, a PDA and the like.

At step 704, the device identifier of the first device can be received via a second communication path. In an aspect, the second device 102 can receive the device identifier of the first device 101 from the first device 101 via a second communication path in a network (e.g., IP network, RF4CE network). The second communication path and the first communication path can be two different paths in a same network or two different networks. In an aspect, the device identifier of the first device 101 can be transmitted from the first device 101 to the second device 102 via a discovery request through a discovery service such as Bonjour or Upnp. For example, when the first device 101 initiates a discovery request, the device identifier of the first device 101 can be broadcast (or otherwise transmitted) from the first device 101 to the second device 102. As another example, the device identifier of the first device 101 can be unicast from the first device 101 to the second device 102. In another aspect, the first device 101 can transmit the device identifier of the first device 101 to the second device 102 via a second communication path by activating and/or executing a device pairing application installed on the first device 101. In an aspect, the step 402 and step 404 can occur simultaneously.

At step 706, the device identifier received via the first communication path and the device identifier received via the second communication path can be compared, associated, or matched. As an example, the second device 102 can compare the device identifier received via the first communication path and the device identifier received via the second communication path. As an example, the device identifier received via the first communication path and the device identifier received via the second communication path can both be the MAC addresses of the first device 101 in a network (e.g., an IP network, a RF4CE network). As an example, the device identifier received via the first communication path and the device identifier received via the second communication path can both be the MAC addresses of the first device 101. In an aspect, if the device identifier received via the first communication path and the device identifier received via the second communication path are identical or near identical, they can be matched. In another aspect, if the device identifier received via the first communication path and the device identifier received via the second communication path are received within a predefined time period (e.g., 30 seconds), they can be matched.

At step 708, an association with the first device over the first communication path and the second communication path can be established. In an aspect, when an association between the first device 101 and the second device 102 is established, the first device 101 (e.g., a remote control) can have the ability to control the second device 102 (e.g., a television set-top box, an alarm system, a lighting system, a heating system, a ventilation system, a cooling system) via the first communication path and via the second communication path. As an example, the control ability can comprise remote tuning a set-top box, ordering premium content via the second device, sharing pictures and other content, accessing security features, setting temperatures, and the like via the first communication path or the second communication path.

In an aspect, the first device 101 can be associated with the second device 102 using a pre-commissioning feature of a multi-system operator (MSO) profile. As an example, the first device 101 (e.g., a remote control) can transmit a discovery request to a plurality of second devices 102 (e.g., a plurality of set top boxes). In the response to the discovery request, the plurality of second devices 102 can be ranked. In an aspect, the highest ranking second device 102 can be selected to associate with the first device 101. In another aspect, the highest ranking second device 102 that has been previously matched to the first device 101 can be selected to associate with the first device 101. In an aspect, the association between the first device 101 and the second device 102 can be automatic without user validation.

In an aspect, when an association between the first device 101 and the second device 102 is established, the communication between the first device 101 and the second device 102 via the first communication path and via the second communication path can be associated. In an exemplary scenario, when the first device 101 is associated with the second device 102, the first device 101 (e.g., a voice enabled remote control) can transmit a first command (e.g., a voice command) to the second device 102 (e.g., set top box) via the first network 105*a* (e.g., an IP network), and transmit a second command (e.g., a radio frequency command) to the second device 102 via a second network 105*b* (e.g., a radio frequency network). In an aspect, the voice command can comprise an audio request from a user to search for a particular channel, a particular type of content, access particular content at a specific time line (e.g., skip 10 minutes, skip advertisement). In another aspect, the radio frequency command can comprise making a selection using one or more buttons on the first device 101 based on the search results requested by the voice command. As such, the first command (e.g., a voice command) and the second command (e.g., a radio frequency command) can be combined for the first device 101 to control the second device 102.

In an aspect, when an association between the first device 101 and the second device 102 is established, a pairing link can be stored in a database (e.g., database 113) associated with the first device 101 and in a database (e.g., database 114) associated with the second device 102. In an aspect, the pairing link can comprise device identifiers (e.g., device identifier 109) and/or network addresses (e.g., address element 110) of the successfully paired devices. In an aspect, the pairing link can minimize the burden of retrieving and/or matching device identifier 109 in a future pairing attempt.

Figure 8:
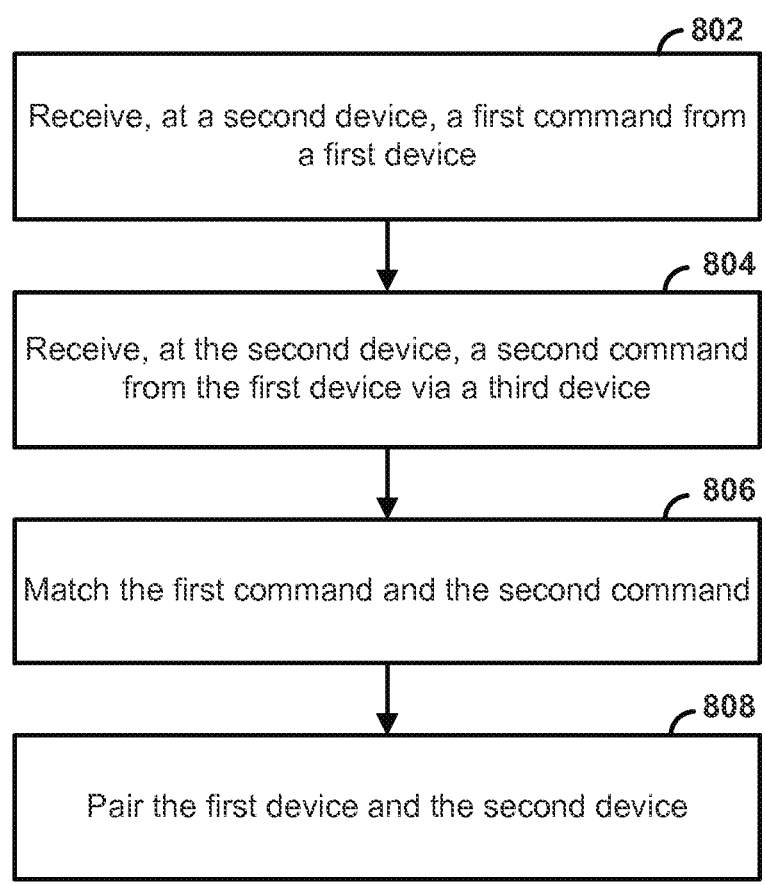
FIG. 8 is a flowchart illustrating yet another example method for managing network devices.

FIG. 8 is another flow chart illustrating an example method for managing network devices. At step 802, a first command can be received at a second device from a first device. As an example, the first command can be a control command, for example, a voice control command. In an aspect, the first command can comprise a device identifier of the first device in a first network (e.g., network 105*a*).

At step 804, a second command can be received at the second device from the first device via a third device. As an example, the second command can be a control command. For example, the second command can be a radio frequency command. In an aspect, the second command can comprise a device identifier of the first device in a second network (e.g., network 105*b*). In an aspect, the device identifier of the second device 102 can be stored in a database (e.g., database 114) of a third device 103. For example, the first device 101 can retrieve a device identifier of a second device 102 (e.g., a first network second device identifier, a second network second device identifier) from the third device 103 and include the retrieved device identifier of the third device in the second command. In an aspect, the first device 101 can provide user information (e.g., user identifier, password, key) to the third device 103 in order to receive a device identifier of the second device 102 (e.g., a first network device identifier, a second network device identifier).

At step 806, the first command and the second command can be matched. For example, the device identifier of the first device in a first network and the device identifier of the first device in a second network can be compared or associated. The first command and the second command can be matched if the device identifier of the first device in a first network and the device identifier of the first device in a second network are matched (e.g., identical or nearly identical).

At step 808, the first device and the second device can be paired. In an aspect, one or more of network identifiers of the first device (e.g., first network first device identifier, second network first device identifier) can be compared with one or more of network identifiers of the second device (e.g., first network second device identifier, second network second device identifier). When the first device is paired with the second device, the communication between the first device 101 and the second device 102 via the first network 105*a* (e.g., an IP network) and via the second network 105*b* (e.g., a RF4CE network) can be associated. In an exemplary scenario, when the first device 101 is associated with the second device 102, the first device 101 (e.g., a voice enabled remote control) can transmit a first command (e.g., a voice command) to the second device 102 (e.g., set top box) via the first network 105*a* (e.g., an IP network), and transmit a second command (e.g., a radio frequency command) to the second device 102 via a second network 105*b* (e.g., a radio frequency network). In an aspect, the voice command can comprise an audio request from a user to search for a particular channel, a particular type of content, access particular content at a specific time line (e.g., skip 10 minutes, skip advertisement). In another aspect, the radio frequency command can comprise making a selection using one or more buttons on the first device 101 based on the search results requested by the voice command. As such, the first command (e.g., a voice command) and the second command (e.g., a radio frequency command) can be combined for the first device 101 to control the second device 102.

Figure 9:
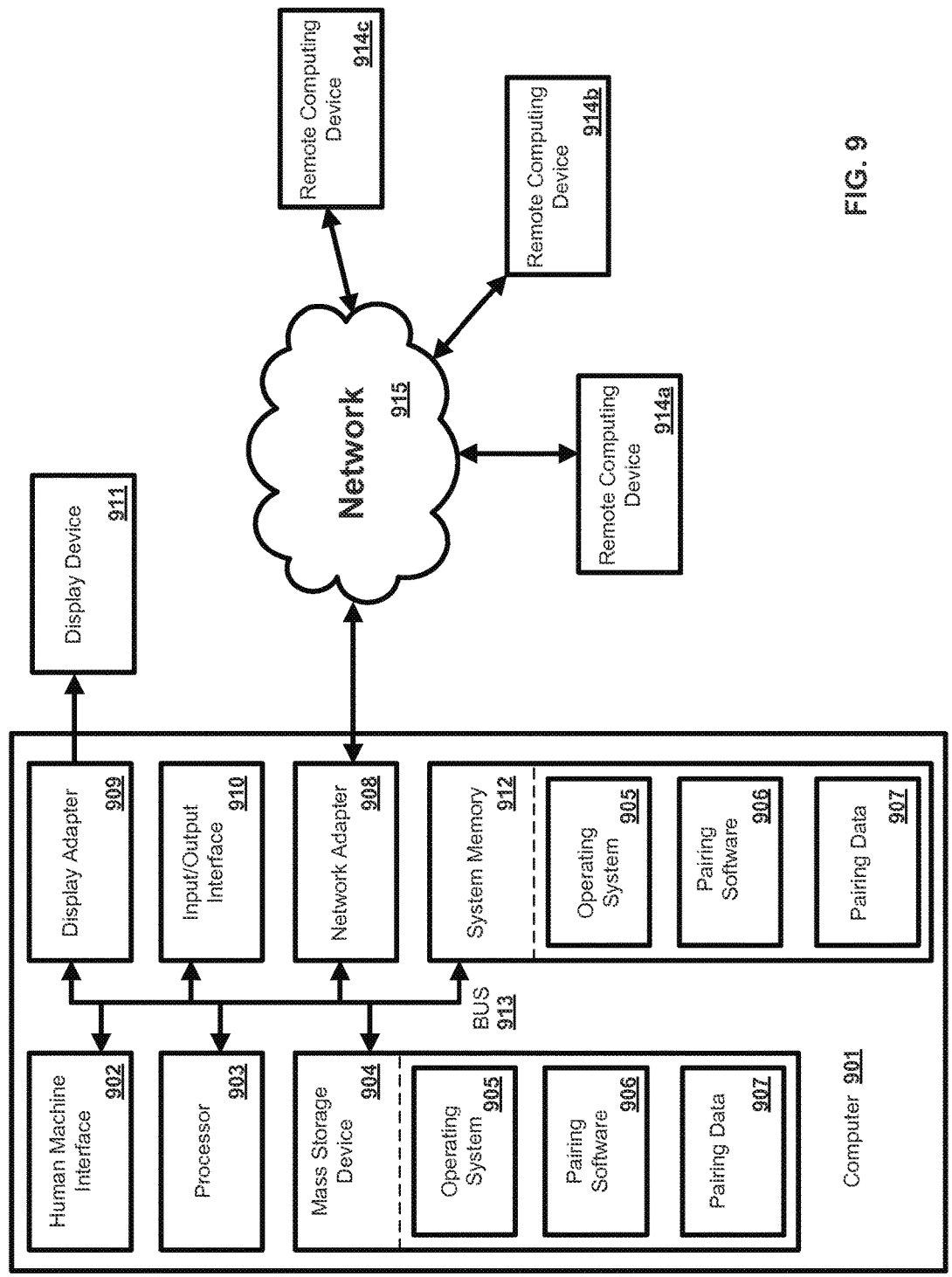
FIG. 9 is a block diagram illustrating an example computing device in which the present methods and systems can operate.

FIG. 9 is a block diagram illustrating an exemplary operating environment for performing the disclosed methods. In an exemplary aspect, the methods and systems of the present disclosure can be implemented on computer 901 as illustrated in FIG. 9 and described below. By way of example, the first device 101 in FIG. 1 and FIG. 2 can be computer 901 as illustrated in FIG. 9. The second device 102, third device 103 and fourth device 104 in FIG. 1 and FIG. 2 can be remote computing device 914a, 914b or 914c respectively as illustrated in FIG. 9. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors 903, a system memory 912, and a system bus 913 that couples various system components including the processor 903 to the system memory 912. In the case of multiple processors 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, pairing software 906, pairing data 907, a network adapter 908, system memory 912, an Input/Output Interface 910, a display adapter 909, a display device 911, and a human machine interface 902, can be contained within one or more remote computing devices 914a,b,c at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data, such as pairing data 907, and/or program modules, such as operating system 905 and pairing software 906, that are immediately accessible to and/or are presently operated on by the processor 903.

In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and pairing software 906. Each of the operating system 905 and pairing software 906 (or some combination thereof) can comprise elements of the programming and the pairing software 906. Pairing data 907 can also be stored on the mass storage device 904. Pairing data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices, such as gloves, and other body coverings, and the like. These and other input devices can be connected to the processor 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components, such as speakers (not shown) and a printer (not shown) which can be connected to the computer 901 via Input/Output interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computer 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 905 are illustrated herein as discrete blocks, although it is recognized that such programs and components reside at various times in different storage components of the computing device 901, and are executed by the data processor(s) of the computer. An implementation of Pairing software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow: plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a computing device from a remote control via a first network comprising an internet protocol (IP) network, a first device identifier of the remote control, wherein the computing device is configured to send the first device identifier to a media device;
   receiving, by the media device from the remote control via a second network comprising a radio frequency network, a second device identifier of the remote control;
   matching the first device identifier and the second device identifier; and
   associating, based on the matching, the media device with the remote control, wherein the associating configures the remote control to control the media device.

2. The method of claim 1, wherein the first device identifier of the remote control comprises a device identifier of the remote control associated with the first network.

3. The method of claim 1, wherein the second device identifier of the remote control comprises a device identifier of the remote control associated with the second network.

4. The method of claim 1, wherein receiving, by the computing device from the remote control via the first network, the first device identifier of the remote control comprises receiving, by the computing device via a discovery request, the first device identifier.

5. The method of claim 1, wherein associating, based on the matching, the media device with the remote control comprises pre-commissioning the remote control.

6. The method of claim 1, wherein the radio frequency network comprises a Bluetooth or a ZigBee protocol based network.

7. The method of claim 1, wherein associating, based on the matching, the media device with the remote control comprises configuring the remote control to control consumption of media on the media device.

8. A method comprising:
   receiving, by a computing device from a remote control via a first communication path comprising an internet protocol (IP) communication path, a first device identifier of the remote control, wherein the computing device is configured to send the first device identifier to a media device;
   receiving, by the media device from the remote control via a second communication path comprising a radio frequency communication path, a second device identifier of the remote control;

matching the first device identifier and the second device identifier; and associating, based on the matching, the media device with the remote control, wherein the associating configures the remote control to control the media device.

9. The method of claim 8, wherein the first device identifier of the remote control comprises a device identifier of the remote control associated with the first communication path.

10. The method of claim 8, wherein the second device identifier of the remote control comprises a device identifier of the remote control associated with the second communication path.

11. The method of claim 8, wherein receiving, by the computing device from the remote control via the first communication path, the first device identifier of the remote control comprises receiving, by the computing device via a discovery request, the first device identifier.

12. The method of claim 8, wherein associating, based on the matching, the media device with the remote control comprises pre-commissioning the remote control.

13. The method of claim 8, wherein the radio frequency control path comprises a Bluetooth or a ZigBee protocol based network.

14. A method comprising:

receiving, by a media device from a remote control via a radio frequency network, a first command comprising a device identifier of the remote control in the radio frequency network;

receiving, by the media device from the remote control via a computing device on an internet protocol (IP) network, a second command;

matching the first command and the second command; and pairing, based on the matching, the remote control and the media device, wherein the pairing configures the remote control to control the media device.

15. The method of claim 14, wherein the first command is a first control command, and wherein the second command is a second control command.

16. The method of claim 14, wherein the second command comprises a device identifier of the remote control associated with the IP network.

17. The method of claim 16, wherein pairing, based on the matching, the remote control and the media device comprises providing, to the media device, the device identifier of the remote control associated with the IP network.

18. The method of claim 14, wherein the media device comprises a set-top box.

19. The method of claim 14, wherein pairing, based on the matching, the remote control and the media device comprises providing user information to the media device.

20. The method of claim 14, wherein the radio frequency network comprises a Bluetooth or a ZigBee protocol based network.

* * * * *